March 13, 1951  A. L. JACKSON  2,545,407

STRIPPER AND CLEANER FOR MEAT TENDERIZING MACHINES

Filed May 17, 1946  3 Sheets-Sheet 1

*INVENTOR.*
ALDRICH L. JACKSON
BY
*ATTORNEY*

March 13, 1951        A. L. JACKSON        2,545,407

STRIPPER AND CLEANER FOR MEAT TENDERIZING MACHINES

Filed May 17, 1946        3 Sheets-Sheet 2

INVENTOR
ALDRICH L. JACKSON

BY *Howard J. Fischer*

ATTORNEY

March 13, 1951     A. L. JACKSON     2,545,407
STRIPPER AND CLEANER FOR MEAT TENDERIZING MACHINES Filed May 17, 1946     3 Sheets-Sheet 3

INVENTOR
ALDRICH L. JACKSON
BY
*Howard L. Fischer*
ATTORNEY

Patented Mar. 13, 1951

2,545,407

UNITED STATES PATENT OFFICE 2,545,407

STRIPPER AND CLEANER FOR MEAT TENDERIZING MACHINES

Aldrich L. Jackson, Minneapolis, Minn., assignor to Hobart-Federal Engineering Corporation, Minneapolis, Minn., a corporation of Minnesota Application May 17, 1946, Serial No. 670,554

3 Claims. (Cl. 17—26)

This invention relates to a stripper and cleaner for meat tenderizing machines which is adapted to strip the meat from the cutting blades of the tenderizer and to simultaneously clean the spaces between the cutting blades.

A feature resides in forming the stripper and cleaner in units which are formed like combs which extend between the blades and which are hinged so as to be swung away from the blades when it is desired. These stripper and cleaner units may be made in one form as individual combs for each tenderizing roller or they may be made in a single unit so that the unit may be swung into operative position.

It is also a feature to provide removable stripper and cleaner units, each unit including fingers for stripping the meat from the cutting blades and stripper fingers adapted to engage the hubs of the collars which space the cutting blades apart.

Heretofore tenderizing machines of this character were provided with stripper fingers which stripped the meat from the cutter blades and the stripper comb with a separate tool which had to be brought into operation to clean the hubs of the spaces periodically owing to the fact that particles of meat would adhere to the hubs of the spaces and the sinews of the meat would also be inclined to wrap around the hub of the spacing collars.

It is a feature of my invention to provide the stripper and cleaner means in a unit so that the tenderizing machine will automatically be cleansed as the stripper operates to strip the meat from the tenderizing cutters.

It is also a feature to provide strippers for the hubs of the spacers in the tenderizing machine which bear against the hubs under spring tension and thus keeps the hubs clean during the operation of the tenderizer.

A further feature resides in combining the stripper fingers and the stripper members so that the stripper fingers will extend from the stripper members and will be formed a part thereof in comb-like fingers which are adapted to be positioned between each of the blades of the tenderizing machine.

These features together with other details and objects of my invention will be more fully and clearly hereinafter set forth:

In the drawings forming part of the specification:

Figure 1:
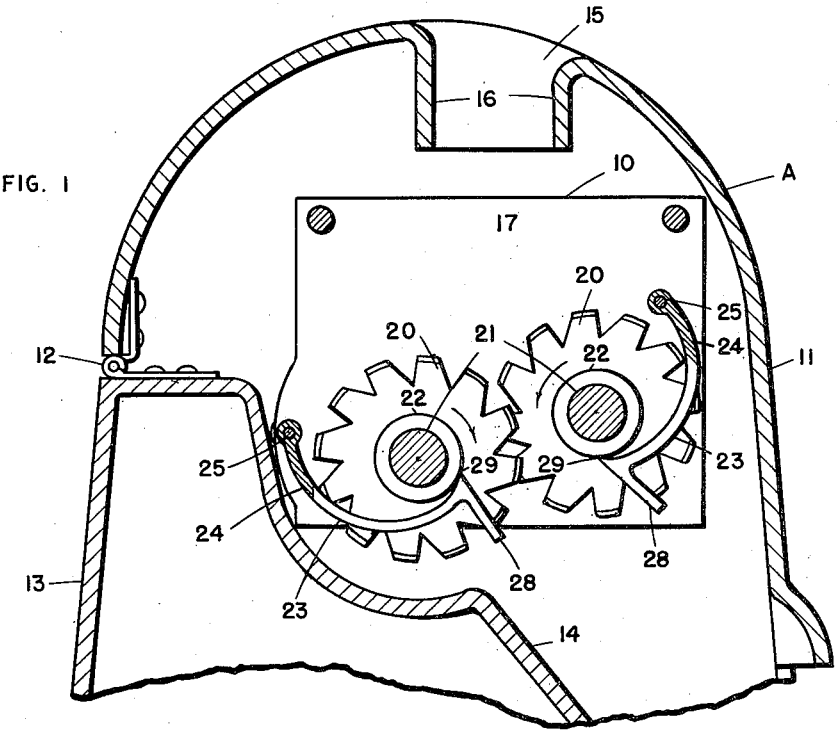
Figure 1 illustrates a vertical section through a portion of a meat tenderizing machine showing the tenderizing rollers within the casing and showing my stripper finger units in operative position.

My stripper and cleanser means is adapted to be used with a meat tenderizer machine A which is formed with a tenderizing unit 10 which may be removed from the machine A when the cover 11 of the casing is elevated on its hinged point 12.

The casing of the machine A is partly broken away, however, the lower portion 13 is partially illustrated and this portion of the casing includes an inclined wall 14 on to which the tenderized meat is deposited when it leaves the tenderizing rollers.

The cover 11 of the casing is formed with an open slot 15 having depending sides 16 which are integral with the cover 11 and which act to guide the meat to the tenderizing rollers.

Figure 3:
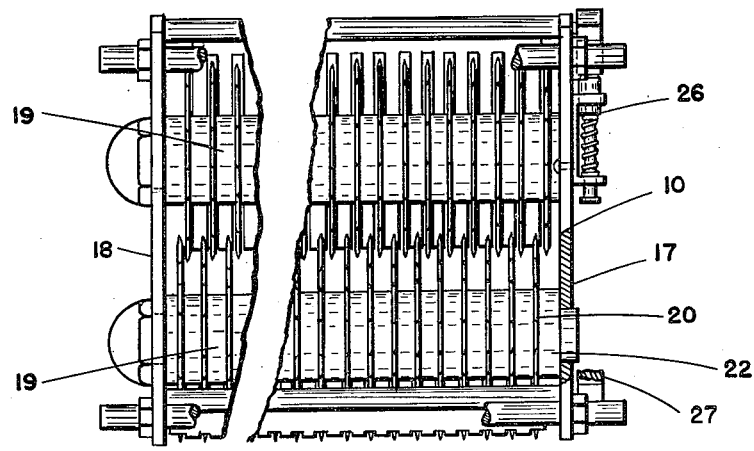
Figure 3 is a plan view looking down on the cutter blades as shown in Figure 1.

The meat tenderizing unit 10 is made up of end walls 17 and 18 shown in Figure 3 and which are adapted to support a pair of rollers 19 which are formed by a series of thin cutting blades 20 mounted on parallel shafts 21 and the cutter blades are spaced apart by the collars 22.

The cutter blades 20 may be formed with sharp edged teeth as illustrated in Figure 1 and the shafts 21 are positioned so that the cutter blades 20 intermesh as illustrated, thus when the machine A is in operation and the rollers with the cutter blades 20 are rotated toward each other in the direction of the arrows in Figure 1 the meat may be dropped through the slot 15 whereupon the cutter blades 20 will engage the same and draw it through the rollers causing the blades 20 to cut the fibers in the meat without crushing it. As the meat passes between the tenderizing rollers, it is carried on through the machine A to the inclined wall 14.

As the meat passes through the machine A it is necessary that it be stripped from the cutting blades 20 and therefore I provide my stripping and cleaning unit to strip the meat from the blades and to keep the hubs of the collars 22 clean of any particles of meat.

My stripper and cleaner units may be in the form illustrated in Figure 1 wherein a series of fingers 23 are connected together with a comb-like form by the back bar 24 which is hinged at 25 as illustrated in Figure 1 with a different and greater radius than hubs 22, the hinge 25 forming an eccentric mounting for the fingers.

Figure 2:
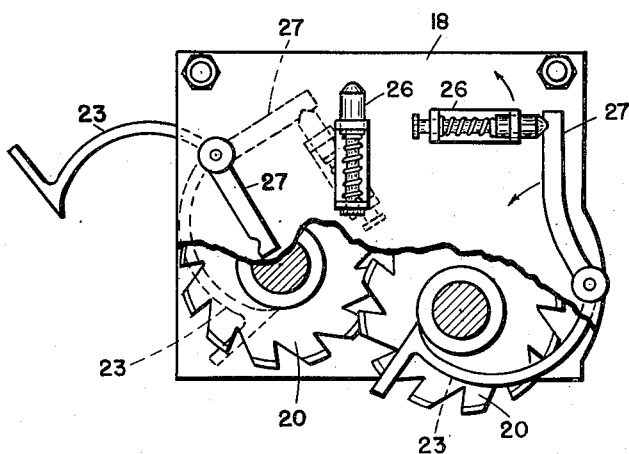
Figure 2 illustrates the stripper and cleaner finger units, one of which is held in operative position by a spring catch and the other of which is shown in dotted line in operative position and in full lines swung away from the cutter blades.

Each comb unit which comprises the series of fingers 23 is held when in operative position by the spring latches 26 positioned on the outer end 18 as illustrated in Figure 2. The spring latches 26 engage the arms 27 under spring tension to hold the comb fingers 23 in the position illustrated in Figure 1. The end wall 18 is broken away at the lower portion to illustrate the position of the comb fingers 23 in operating. One of the units show the comb fingers 23 in dotted outline and illustrates in full lines the fingers 23 rotated away from the cutter discs 20.

The spring latches 26 may be released to free the arms 27 which are mounted on the ends of the rods which hinge the comb fingers 23 at 25. When the arms 27 are released the comb can be swung out as illustrated on the left of Figure 2 which shows the comb fingers 23 in full outline.

The comb fingers 23 are formed with finger stripping ends 28 which extend between each of the cutter discs 20. The inner ends of the stripper finger portions 28 are formed with sharp stripper portions 29 which bear against the hubs of the spacer collars 22 and act to scrape any particles of meat or sinews of meat from the hubs of the collars. The spring latches 26 keep the stripper edges 29 bearing against the collars 22 under spring tension. Thus the comb units with the fingers 23 and the stripping ends 28 together with the stripping edges 29 keep the cutting discs 20 clean of any meat and also automatically clean the hubs of the collars 22 while the tenderizer is in operation.

Figure 4:
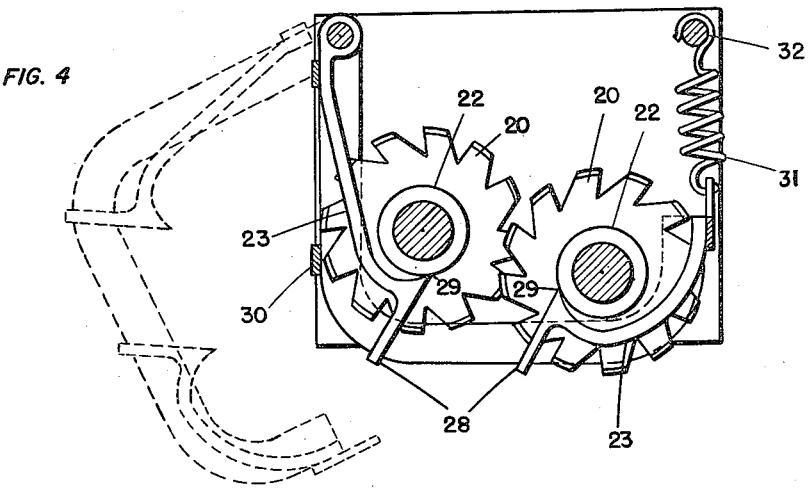
Figure 4 is a side sectional elevation showing a pair of meat tenderizing rollers and showing the stripper and cleaner unit in full lines in operative position and in dotted lines swung out away from the tenderizing rollers.

The stripper and cleaning units may be joined together as illustrated in Figure 4 by the bars 30 which are positioned at the ends of the tenderizer unit and act to hold the fingers 23 connected together for each pair of tenderizing rollers formed by the discs 20. In this form of my stripper and cleaner unit the entire unit may be swung out as illustrated in dotted outline away from the cutter discs 20.

In operative position the unit shown in Figure 4 is held by the coil spring 31 which hooks over the shaft 32 to hold the pair of stripping and cleaning units under spring tension with the stripping edges 29 bearing against the hubs of the spacer collars 22.

Figure 5:
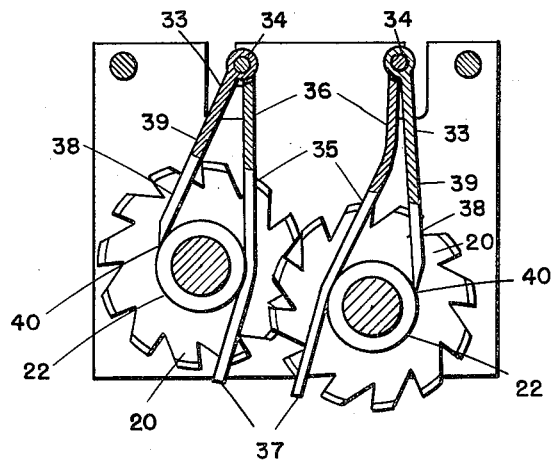
Figure 5 illustrates another form of my stripper and cleaner units wherein the stripper and cleaner units are adapted to straddle the hubs between the cutting discs and showing the units removable.

In Figure 5 I have illustrated a different form of stripper and cleaner unit. In this form I provide a separate unit for each of the tenderizing rollers. These units 33 are pivoted on the shafts 34. The stripper fingers 35 extend from the shafts 34 between each of the cutter discs 20 and are connected together by the back bar portion 36 while the free ends 37 of the fingers project beyond the diameter of the cutting discs 20.

Figure 6:
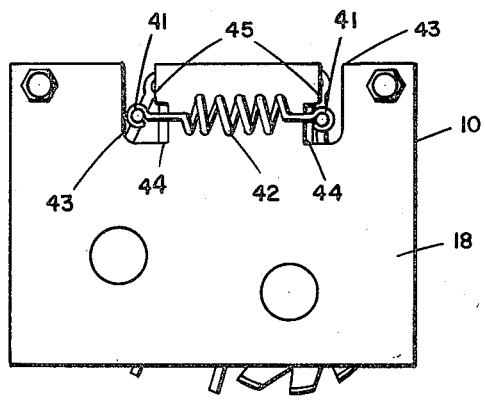
Figure 6 is an outside end view of the tenderizing unit which supports the tenderizer rollers and showing a spring for holding the stripper and cleanser unit for each roller connected together.
Figure 8:
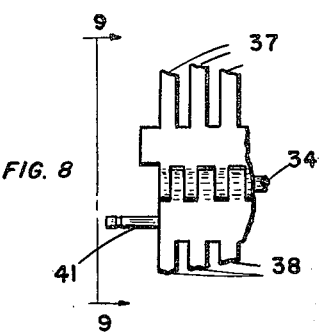
Figure 8 is a detail portion of the stripper and cleanser unit showing the manner in which the combs are hinged together.
Figure 7:
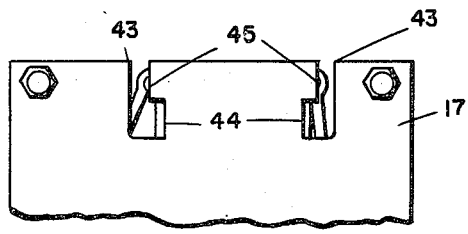
Figure 7 is a detailed end view of the opposite end to that shown in Figure 6 of the unit which supports the tenderizing rollers.
Figure 9:
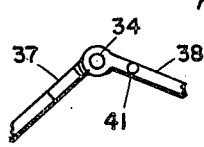
Figure 9 is an end view of Figure 8 taken on the line 9—9.

As illustrated in Figure 5, the stripper and cleaner units 33 are formed with separate cleaning fingers 38 which are connected by the back bar 39 which is also hinged to the shaft 34 in the manner illustrated in Figures 8 and 9. The stripper fingers 38 are formed with sharp scraping edges 40 which bear against the hubs of the spacer collars 22. In this form of my stripping and cleaning units each of the units 33 straddle the collars 22 as illustrated in Figure 5 and by means of the lugs 41 the units 33 are connected together by the coil spring 42 illustrated in Figure 6 on one end of the tenderizing unit 10.

I provide slots 43 in the ends 17 and 18 into which the lugs 44 slide to removably hold each of the units 33 from the tenderizing unit 10. The slots 43 are formed with shoulder portions 45 so that the lugs 44 may engage beneath the same to hold the units 33 under the tension of the spring 42 in operative position.

When it is desired to remove the stripper and cleaner units 33, the lugs 44 are released against the tension of the spring 42 so that the lugs 44 may be lifted out of the slots 43 and thus the stripper fingers 37 and the stripping fingers 38 may be removed as a unit from between the cutter discs 20.

It will therefore be apparent that I provide a stripper and cleaning means for meat tenderizing machines where a series of cutting discs are mounted on parallel shafts and the meat to be tenderized is passed between these tenderizing rollers. The strippers automatically strip the meat from the cutting discs and the sharp stripper edges of the stripping fingers bear against the hubs of the spacer collars and keep the same clean of any particles of meat or sinews, which have a tendency to cling to the hub and wrap around the same were it not for the cleaning action of my spacing fingers during the operation of the tenderizer. My stripper and cleaner operates automatically to keep the tenderizing machine clean at all times. It will be apparent that it is highly essential that a meat tenderizing machine be kept just as clean as possible so as to keep the same sanitary and I have accomplished this by my stripper and cleaner units so that it is not necessary for the operator to stop and clean the machine now and then as this is taken care of automatically during the operation of the machine.

I claim:

1. A stripper and cleaner finger for meat tenderizing units including an arcuated blade cleaner portion terminating in a sharp edge portion adapted to contact the hub of a unit and of a radius greater than that of the hub of the unit maintaining the major extent of said actuated portion spaced from and out of contact with said hub, and a stripping free end portion extending from said hub-contacting sharp edge in the direction of discharge of a meat product to form a stripping guide, and securing means formed on the end of said arcuated blade cleaner portion opposite said sharp edge portion.

2. A stripper and cleaner finger unit for the blades and hubs of a meat tenderizing unit, each stripper and cleaner finger having an arcuated cleaner portion of a different radius greater than that of the hubs of the unit, a sharp edge portion formed on each of said fingers adapted to contact the hubs which support the blades in a limited area on the discharge side thereof to automatically clean the hubs, and a free end stripper portion extending from said sharp edged portion in the direction of discharge of the meat for guiding and stripping the meat from the blades and hubs.

3. A series of stripper fingers for each of a pair of cooperating meat tenderizing units having a series of tenderizing knives supported on hubs, comprising a chisel edge formed on each of said fingers adapted to engage said hubs on the discharge side thereof to scrape the same, means for mounting said series of stripper fingers eccentrically with respect to said hubs so as to maintain a major portion of said fingers spaced from and out of contact with said hubs, and a free end body portion extending from each of said chisel edges in the direction of discharge of a food product therethrough adapted to clean the sides of said blades and guide the food product from said hubs and blades.

ALDRICH L. JACKSON.

REFERENCES CITED

The following references are of record in the file of this patent:

UNITED STATES PATENTS

| Number | Name | Date |
|---|---|---|
| 776,945 | Riedel | Dec. 6, 1904 |
| 880,589 | Snelling | Mar. 3, 1908 |
| 1,644,608 | Perez | Oct. 4, 1927 |
| 1,973,284 | Huse | Sept. 11, 1934 |
| 1,976,751 | Short | Oct. 16, 1934 |
| 2,001,641 | West | May 14, 1935 |
| 2,025,505 | Gonser | Dec. 24, 1935 |
| 2,163,123 | Huse | June 20, 1939 |
| 2,346,686 | Jackson | Apr. 18, 1944 |

FOREIGN PATENTS

| Number | Country | Date |
|---|---|---|
| 9,012 | Great Britain | 1897 |
| 182,795 | Germany | Mar. 2, 1907 |
| 692,605 | Germany | June 22, 1940 |